US00RE36141E

United States Patent [19]

Koziol

[11] E Patent Number: Re. 36,141

[45] Reissued Date of Patent: Mar. 16, 1999

[54] STORAGE STAND FOR COMPACT DISCS

[76] Inventor: Stephan Koziol, Werner-von-Siemens-Strasse 90, D-64711 Erbach/Odenwald, Germany

[21] Appl. No.: 18,999

[22] Filed: Jan. 18, 1994

Related U.S. Patent Documents

Reissue of:

[64] Patent No.: Des. 340,155
Issued: Oct. 12, 1993
Appl. No.: 825,860
Filed: Jan. 27, 1992

[30] Foreign Application Priority Data

Jul. 27, 1991 [DE] Germany ..... M 91 05 223.8

[51] LOC (6) Cl. ..... 06-04

[52] U.S. Cl. ..... D6/450; D6/407; D6/455

[58] Field of Search ..... D6/407, 626, 627, D6/628, 629, 630, 631, 632, 450, 455, 457; D25/1, 5, 6, 26, 33; 211/134, 26, 27, 40, 41

[56] References Cited

U.S. PATENT DOCUMENTS

| | | | |
|---|---|---|---|
| D. 51,942 | 4/1918 | Raalte | D6/455 |
| D. 77,742 | 2/1929 | Corontneff | D9/529 |
| D. 91,044 | 11/1933 | Urbanek | D25/6 |
| D. 208,905 | 10/1967 | Gregoire | D25/5 |
| D. 265,148 | 6/1982 | Dwyhalo | D6/407 |
| 3,010,290 | 11/1961 | Fredrick | D6/450 |

OTHER PUBLICATIONS

DOMAS: Feb. 1986; p. 23 "South Ferry Plaza" Bldg. lower center of page.

POTPURRI: Holiday, 1992 p. 79 Item #91212 "CD Tower" lower right hand corner of page.

*Primary Examiner*—Celia Murphy
*Attorney, Agent, or Firm*—Michael J. Striker

[57] CLAIM

The ornamental design for a storage stand for compact discs, as shown and described.

DESCRIPTION

1 Claim, 5 Drawing Sheets

Figure 1:
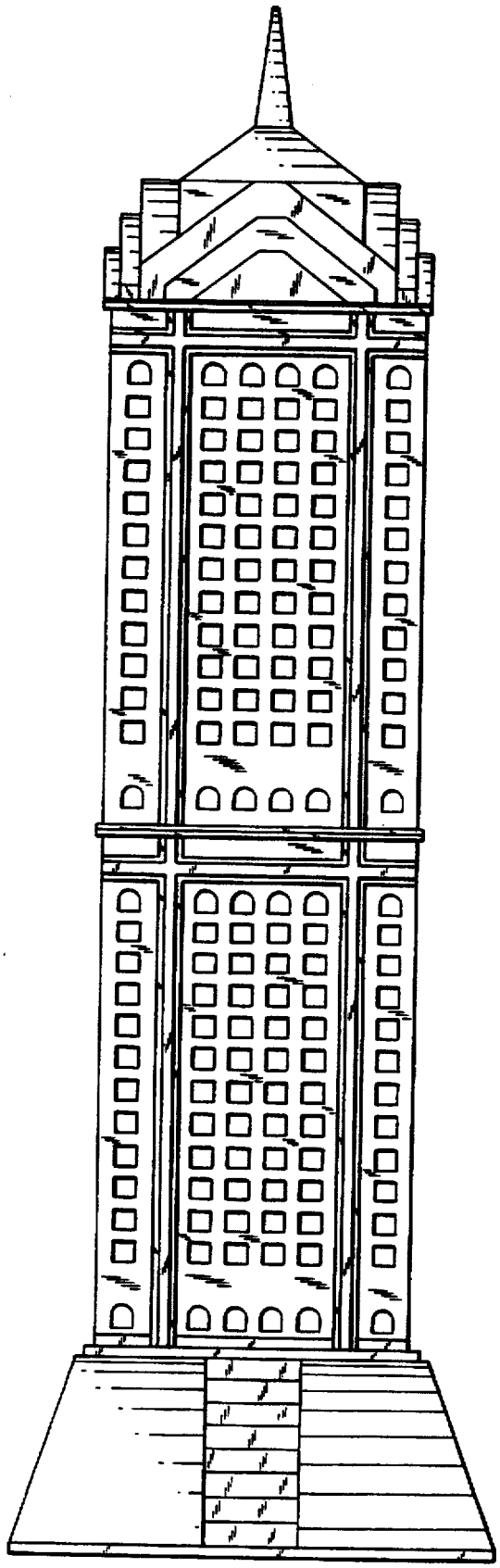
FIG. 1 is a front elevational view of a storage stand for compact discs showing my new design.
Figure 2:
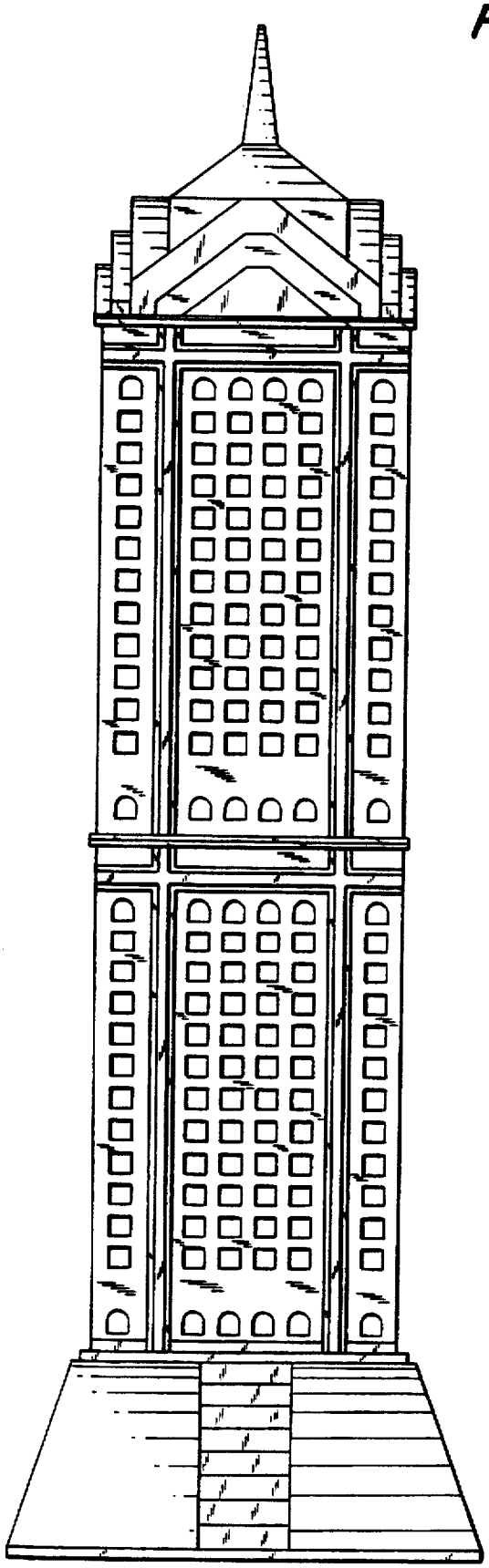
FIG. 2 is a rear elevational view thereof.
Figure 3:
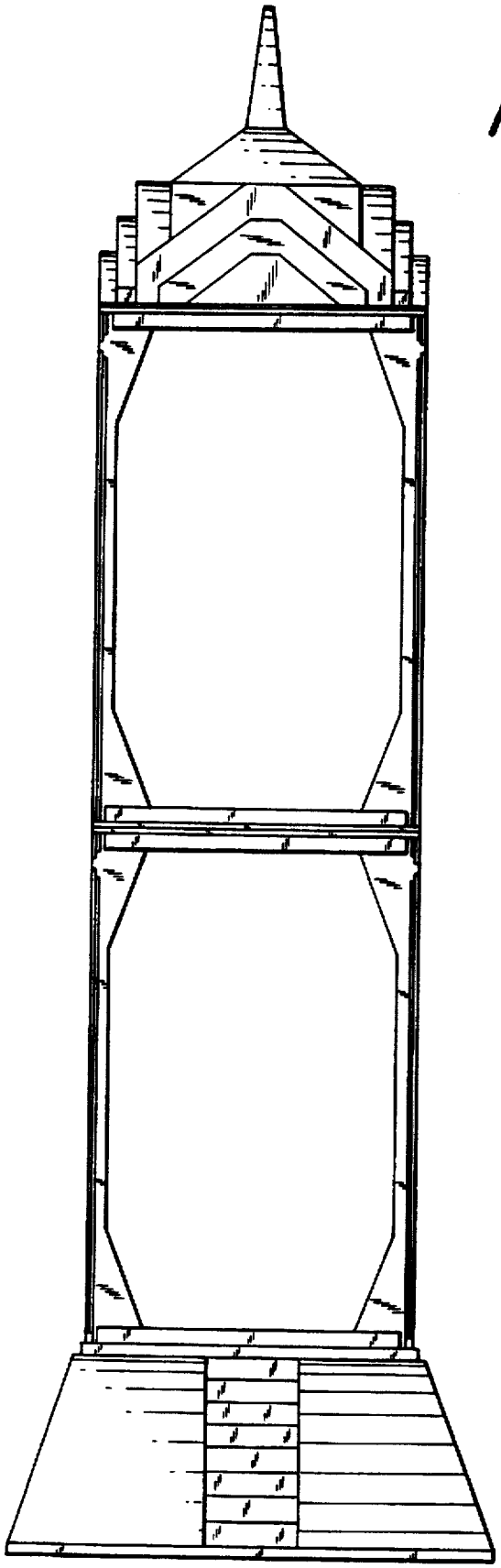
FIG. 3 is a side elevational view thereof, both sides being identical.
Figure 4:
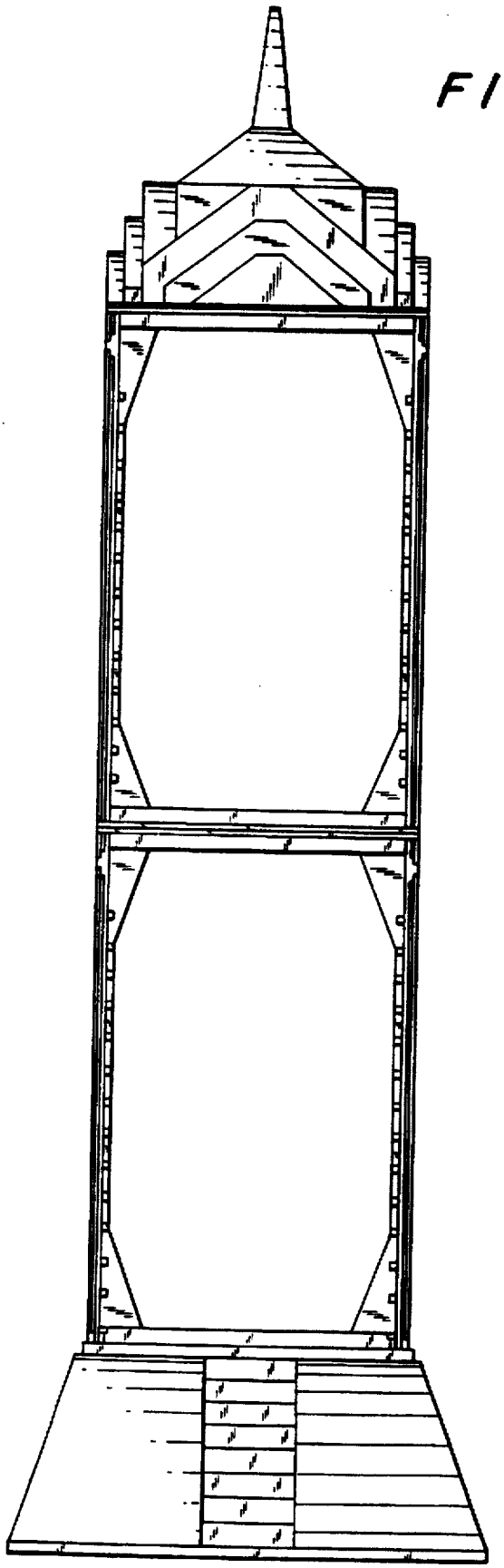
FIG. 4 is a rear elevational view thereof.
Figure 5:
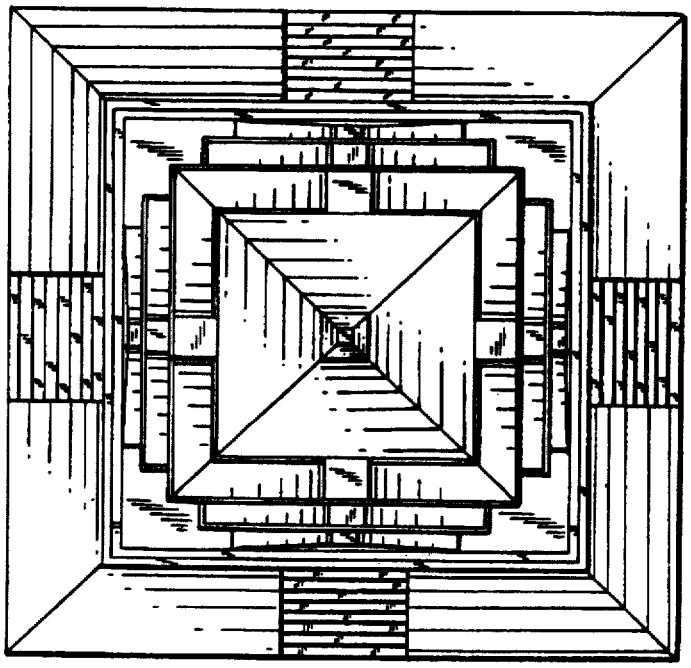
FIG. 5 is a top plan view thereof, the bottom being planar and unadorned.

Matter enclosed in heavy brackets [ ] appears in the original patent, but forms no part of this reissue; matter printed in italics indicates the additions made by reissue.